(12) United States Patent
Chang et al.

(10) Patent No.: US 7,843,534 B2
(45) Date of Patent: Nov. 30, 2010

(54) IMAGE DISPLAY SYSTEM

(75) Inventors: Wei-Chih Chang, Hsinchu County (TW); Su-Jung Hsu, Miaoli County (TW)

(73) Assignee: TPO Displays Corp., Miao-Li County (TW)

( * ) Notice: Subject to any disclaimer, the term of this patent is extended or adjusted under 35 U.S.C. 154(b) by 191 days.

(21) Appl. No.: 12/015,346

(22) Filed: Jan. 16, 2008

(65) Prior Publication Data

US 2008/0180606 A1 Jul. 31, 2008

(30) Foreign Application Priority Data

Jan. 18, 2007 (TW) .............................. 96101950 A

(51) Int. Cl.
*G02F 1/1335* (2006.01)
(52) U.S. Cl. ........................................ 349/114; 349/96
(58) Field of Classification Search ................... 349/96, 349/114
See application file for complete search history.

(56) References Cited

U.S. PATENT DOCUMENTS

| 2005/0140905 A1* | 6/2005 | Yang ........................... 349/141 |
| 2005/0275769 A1* | 12/2005 | Roh et al. .................... 349/109 |
| 2006/0139527 A1* | 6/2006 | Chang et al. ................. 349/114 |
| 2006/0192912 A1* | 8/2006 | Itou et al. .................... 349/114 |

* cited by examiner

*Primary Examiner*—Jerry T Rahll
(74) *Attorney, Agent, or Firm*—Birch, Stewart, Kolasch & Birch, LLP

(57) ABSTRACT

An image display system includes a first polarizer, a first substrate, a liquid crystal (LC) layer and a second substrate. The first polarizer is disposed on the first substrate. The LC layer has a plurality of LC cells each having an optical axis parallel to an absorbing axis of the first polarizer. The second substrate has a plurality of light transmitting zones and a plurality of light reflecting zones. A plurality of reflectors is disposed within the light reflecting zone. The LC cells are horizontally disposed between the first substrate and the second substrate. The LC cells corresponding to the light reflecting zones are driven in a normally white mode, while the LC cells corresponding to the light transmitting zones are driven in a normally black mode.

16 Claims, 5 Drawing Sheets

IMAGE DISPLAY SYSTEM

CROSS REFERENCE TO RELATED APPLICATIONS

This Non-provisional application claims priority under 35 U.S.C. §119(a) on Patent Application No(s). 096101950 filed in Taiwan, Republic of China on Jan. 18, 2007, the entire contents of which are hereby incorporated by reference.

BACKGROUND OF THE INVENTION

1. Field of Invention

The invention relates to an image display system and, in particular, to an image display system with transversely aligned liquid crystals.

2. Related Art

The liquid crystal display (LCD) apparatus is a flat display system. The LCD apparatuses may be classified into a twisted nematic (TN) type, a multi-domain vertical alignment (MVA) type, an in-plane switching (IPS) type and a fringe-field switching (FFS) type according to the arrangements of the liquid crystals. The MVA type, the IPS type and the FFS type are frequently seen in the field of the wide viewing angle display technology.

The typical IPS or FFS type LCD apparatus includes top and bottom substrates disposed opposite to each other, and a liquid crystal (LC) layer interposed between the two substrates. Pixel electrodes and common electrodes are simultaneously disposed on the bottom substrate so that a transversal electric field is generated in the LC layer to control the liquid crystals to rotate.

On the other hand, the LCD apparatuses may also be classified into a transmissive type, a transflective type and a reflective type according to the form of the light source. The transflective LCD apparatus has a backlight module and an external light reflecting structure, so it can be watched by a user in the environment without external light as well as the environment with the sunlight.

The viewing angle of the transflective LCD apparatus may be increased with the combination of the alignment method of the liquid crystals in the IPS type or the FFS type LCD apparatus. More specifically, the alignment method of the liquid crystals in the FFS type LCD apparatus can achieve the advantages of the high transmission rate and the low color shift. However, such a small-sized LCD apparatus is more sensitive to the cell gap between the substrates and the temperature variation in the transmissive mode, and also has the problem of the deteriorated viewing angle. Especially, the image contrast is seriously lowered when the slight alternate variation of the substrate occurs.

Therefore, it is an important subject to provide an image display system for reducing the alternate variation of the substrate so as to keep the image quality.

SUMMARY OF THE INVENTION

In view of the foregoing, the invention is to provide an image display system for reducing an alternate variation of a substrate to keep the image quality.

To achieve the above, the invention discloses an image display system including a first polarized, a first substrate, a liquid crystal (LC) layer and a second substrate. The first polarizer is disposed on the first substrate. The LC layer has a plurality of LC cells, each of which has an optical axis parallel to an absorbing axis of the first polarizer. The second substrate has a plurality of light transmitting zones and a plurality of light reflecting zones, and a plurality of reflectors is disposed in the light reflecting zones. The LC cells are horizontally disposed between the first substrate and the second substrate. Herein, the LC cells corresponding to the light reflecting zones are driven in a normally white mode, and the LC cells corresponding to the light reflecting zones are driven in a normally black mode.

As mentioned above, the image display system of this invention displays the image in a transflective manner, the optical axes of the LC cells are arranged to be parallel to the absorbing axis of the first polarizer when it is aligned, and the LC cells in the light reflecting zones and the light transmitting zones are respectively driven in the normally white mode and the normally black mode. Thus, the influence of the variation of the cell gap between the substrates on the optical system is smaller under this aligned architecture of the liquid crystals so that the image quality can be kept.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
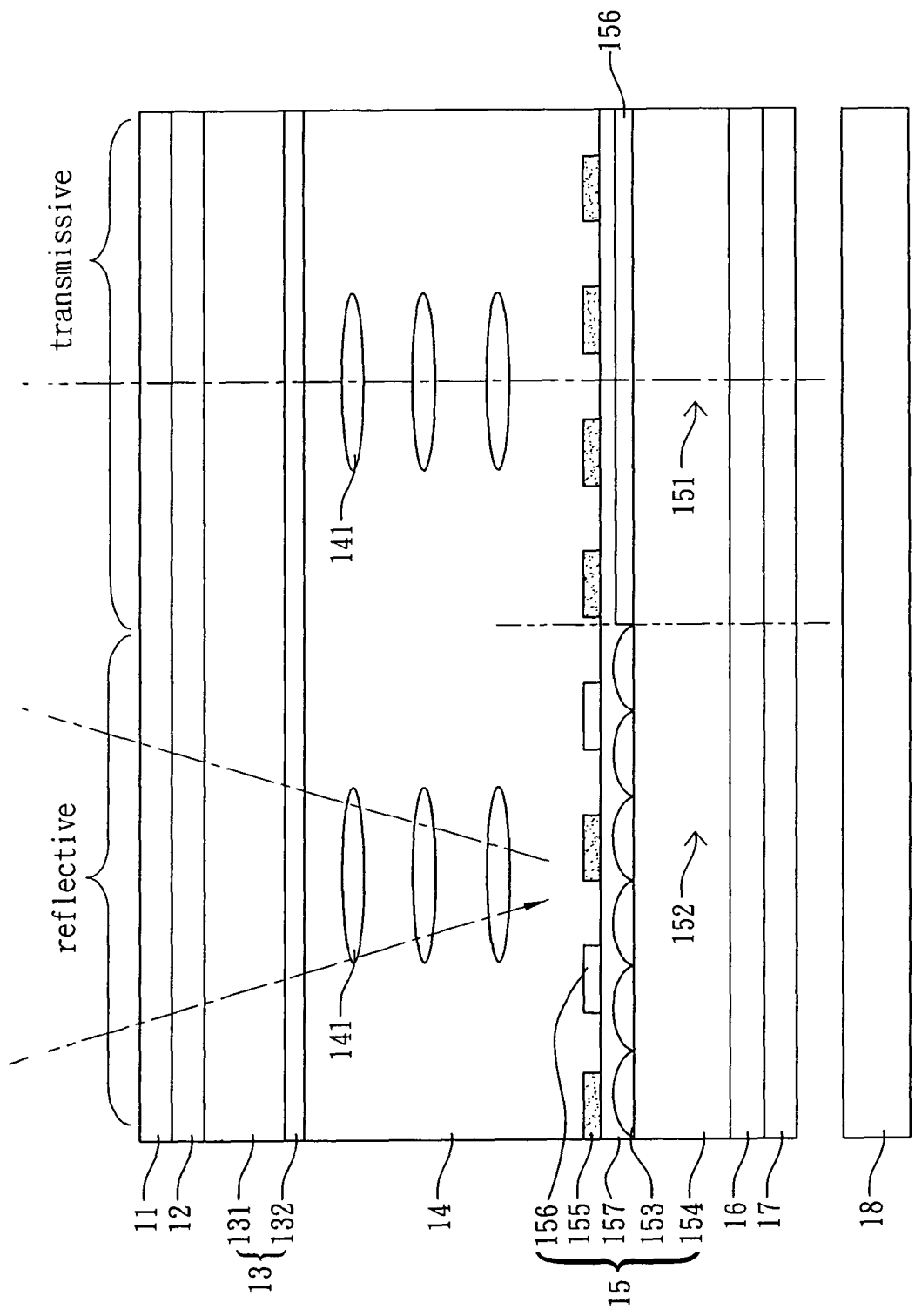
FIG. 1 is a schematic illustration showing an image display system according to a preferred embodiment of the invention.

FIG. 1 is a schematic illustration showing an image display system 1 according to an embodiment of the invention. As shown in FIG. 1, the image display system 1 includes a first polarizer 11, a first retardation plate 12, a first substrate 13, a LC layer 14, a second substrate 15, a second retardation plate 16, a second polarizer 17 and a backlight module 18. In the embodiment, the first polarizer 11 to the second polarizer 17 are assembled together to form a LCD panel, and the backlight module 18 may be assembled with the LCD panel to form a LCD apparatus.

The first polarizer 11 and the first retardation plate 12 are disposed at the same side of the first substrate 13 and in correspondence with the LC layer 14. The first retardation plate 12 is disposed between the first polarizer 11 and the first substrate 13. The LC layer 14 is disposed at the other side of the first substrate 13. The second polarizer 17 and the second retardation plate 16 are disposed at the same side of the second substrate 15 and in correspondence with the LC layer 14. The second retardation plate 16 is disposed between the second polarizer 17 and the second substrate 15, and the LC layer 14 is disposed at the other side of the second substrate 15.

The LC layer 14 is disposed between the first substrate 13 and the second substrate 15 and has a plurality of LC cells 141. The LC cell 141 has an optical axis parallel to an absorbing axis of the first polarizer 11. The LC cell 141 is horizontally disposed between the first substrate 13 and the second substrate 15. In practice, alignment films (not shown) are disposed on the sides of the first substrate 13 and the second substrate 15 facing each other. A trench mark structure of the alignment film can make all the LC cells 141 face a predetermined direction. If the predetermined direction is the same as the direction of the absorbing axis of the first polarizer 11, the optical axes of all the LC cells 141 may be parallel to the absorbing axis of the first polarizer 11. Thus, the influence of the variation of the cell gap between the substrates on the optical system is smaller so that the image quality can be kept.

The image display system 1 has the transflective architecture. The second substrate 15 has a plurality of light transmitting zones 151 and a plurality of light reflecting zones 152. A plurality of reflectors 153 for reflecting the external light to represent the image is disposed in the light reflecting zone 152. The light transmitting zone 151 represents the image by the backlight module 18 which provides the light. In this embodiment based on the horizontal direction of each optical device, the absorbing axis of the first polarizer 11 is arranged at 75 degrees, the retardation axis of the first retardation plate 12 is arranged at 60 degrees, the LC cell 141 is aligned horizontally and has the optical axis arranged at 75 degrees, the retardation axis of the second retardation plate 16 is arranged at 120 degrees, and the absorbing axis of the second polarizer 17 is arranged at 15 degrees. In addition, when the LC cell 141 is driven by the electric field, it can be rotated by 45 degrees around the vertical direction. The first retardation plate 12 and the second retardation plate 16 convert the light from the linearly polarized light into the circularly polarized light, or from the circularly polarized light into the linearly polarized light so as to reduce the color difference.

Figure 2A:
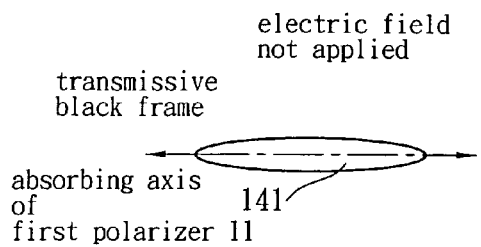
FIGS. 2A and 2B are schematic illustrations showing LC cells driven in a normally black mode according to the preferred embodiment of the invention.
Figure 2B:
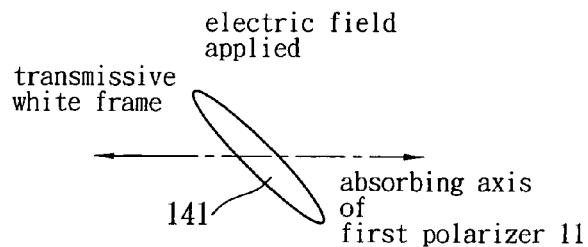

Under the configuration of this embodiment, the LC cells 141 corresponding to the light transmitting zone 151 are driven in a normally black mode, and the schematic illustrations of the LC cell 141 that is driven and the LC cell 141 that is not driven are shown in FIGS. 2A and 2B.

As shown in FIG. 2A, when the LC cell 141 is not driven by the electric field, the LC cell 141 still keeps the originally horizontally arranged direction, and the light emitted from the backlight module 18 sequentially penetrates through the second polarizer 17, the second retardation plate 16, the light transmitting zone 151 of the second substrate 15, the LC cell 141 that is not rotated, the first substrate 13 and the first retardation plate 12, but the light cannot penetrate through the first polarizer 11 so that the black frame can be displayed.

As shown in FIG. 2B, when the LC cell 141 is driven by the electric field, the light emitted from the backlight module 18 penetrates through the LC cell 141 and the polarization direction thereof is changed. Thus, the light can penetrate through the first polarizer 11 so that the gray or white frame can be displayed. As for the white frame, the LC cell 141 is driven and rotated by 45 degrees around the vertical direction, and the optical property of the LC cell may be analogical to a □/2 retardation plate.

Figure 3A:
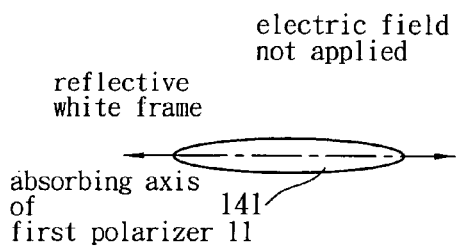
FIGS. 3A and 3B are schematic illustrations showing LC cells driven in a normally white mode according to the preferred embodiment of the invention.
Figure 3B:
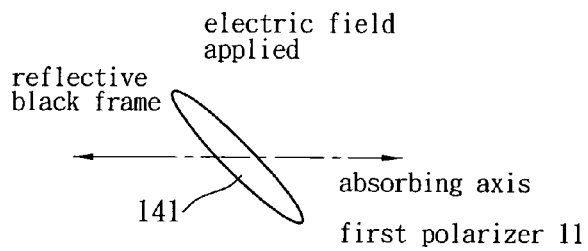

In addition, the LC cells 141 corresponding to the light reflecting zone 152 are driven in a normally white mode, and the schematic illustrations of the LC cell that is driven and the LC cell that is not driven are shown in FIGS. 3A and 3B. As shown in FIG. 3A, when the LC cell is not driven by the electric field, the LC cell 141 still keeps the originally horizontally arranged direction, and the external light sequentially penetrates through the first polarizer 11, the first retardation plate 12, the first substrate 13 and the LC cell 141 that is not rotated, and is reflected by the reflector 153 of the second substrate 15 to sequentially penetrate through the LC cell 141 that is not rotated, the first substrate 13, the first retardation plate 12 and the first polarizer 11 to represent the image so that the white frame can be displayed.

As shown in FIG. 3B, when the LC cell 141 is driven by the electric field, the external light penetrates through the LC cell 141 and the polarization direction thereof is changed. The reflected light having the polarization direction the same as the absorbing axis of the first polarizer 11 cannot penetrate through the first polarizer 11 so that the gray or black frame may be displayed. As for the black frame, the LC cell is driven and thus rotated by 45 degrees, and the optical property of the LC cell may be analogical to a □/4 retardation plate.

Referring again to FIG. 1, the first substrate 13 is a color filter substrate and includes a first transparent substrate 131 and a plurality of color filters 132. The first transparent substrate 131 may be a glass substrate, and the color filter 132 is disposed at one side of the first transparent substrate 131 adjacent to the LC layer 14. Thus, the color image may be represented after either the externally inputted input light or the light provided by the backlight module 18 penetrates through the color filter 132.

The second substrate 15 includes a second transparent substrate 154, a plurality of pixel electrodes 155 and a plurality of common electrodes 156. The second transparent substrate 154 may be a glass substrate, and the pixel electrode 155 and the common electrode 156 are disposed on one side of the second transparent substrate 154 adjacent to the LC layer 14. The common electrode 156 and the corresponding pixel electrode 155 form a liquid crystal capacitor so that a transversal electric field is generated in the LC layer 14 to drive the LC cell 141 to rotate.

In addition, thin film transistors, column wires and row wires are formed on the second transparent substrate 154. The thin film transistor serves as a writing switch for the liquid crystal capacitor. When a row driving circuit turns on the thin film transistor, a column driving circuit can write data into the pixel electrode 155 to update pixel data stored in the liquid crystal capacitor so that the frame content can be updated. If the light transmitting zone 151 and the light reflecting zone 152 are simultaneously disposed in a pixel, different voltages with two levels corresponding to the same data are respectively provided to the pixel electrode 155 of the light reflecting zone 152 and the pixel electrode 155 of the light transmitting zone 151. The relationship curves between these voltages are shown in FIG. 4.

Figure 4:
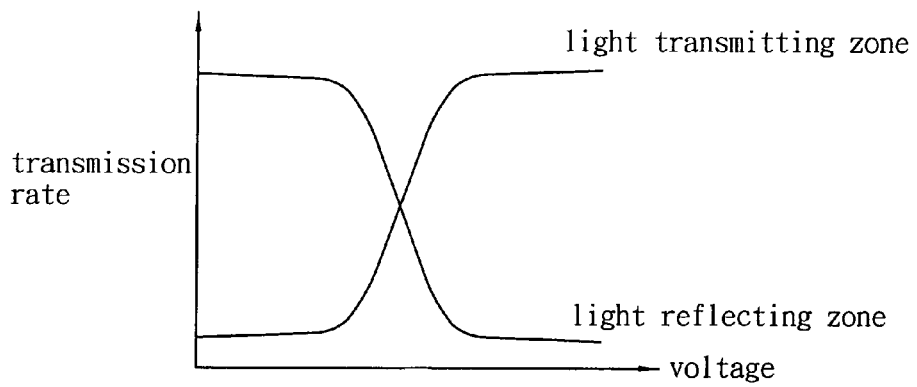
FIG. 4 is a schematic illustration showing relationship curves between a voltage and a transmission rate in the light transmitting zone and the light reflecting zone according to the preferred embodiment of the invention.

FIG. 4 is a schematic illustration showing relationship curves between a voltage and a transmission rate in the light transmitting zone 151 and the light reflecting zone 152 according to the embodiment of the invention. As shown in FIG. 4, the light transmitting zone 151 has the lower transmission rate when its pixel electrode 155 has a low level, and has the higher transmission rate when its pixel electrode 155 has a high level, wherein such a display method is the so-called normally black mode. The light reflecting zone 152 has the higher transmission rate when its pixel electrode 155 has the low level, and has the lower transmission rate when its pixel electrode 155 has the high level, wherein such a display method is the so-called normally white mode.

Therefore, if the transmission rates corresponding to the same data have to be obtained in the light transmitting zone 151 and the light reflecting zone 152, the pixel electrode 155 of the light transmitting zone 151 has to be set to the low level when the pixel electrode 155 of the light reflecting zone 152 has the high level. On the contrary, when the pixel electrode 155 of the light reflecting zone 152 has the low level, the pixel electrode 155 of the light transmitting zone 151 has to be set to the high level. The level variations of the supplied voltages under the two different display modes are inversely proportional to each other. Because one of ordinary skill in the art may easily understand how these elements can be formed and how the elements can be formed on the second transparent substrate 154, these elements are not shown in the drawings.

In this embodiment, the reflector 153 is disposed on the second transparent substrate 154 in the light reflecting zone 152, an insulating layer 157 is firstly formed on the reflector 153 and then the pixel electrodes 155 and the common electrodes 156 are disposed alternately on the insulating layer 157 so that the IPS type is obtained.

In the light transmitting zone 151, the common electrode 156 is disposed on the second transparent substrate 154, the insulating layer 157 is formed on the common electrode 156 and then the pixel electrodes 155 are disposed on the insulating layer 157 alternately so that the FFS type is obtained.

In addition, the arrangements of the pixel electrodes 155 and the common electrodes 156 are not limited thereto. The pixel electrodes and the common electrodes in the light reflecting zone and the light transmitting zone may also be disposed in an IPS manner, a FFS manner; or a transversal electric field manner.

In addition, the color filter may also be integrated in the second substrate 15 and is not formed in the first substrate 13. That is, the second substrate 15 is a color-filter-on-array (COA) substrate.

Figure 5:
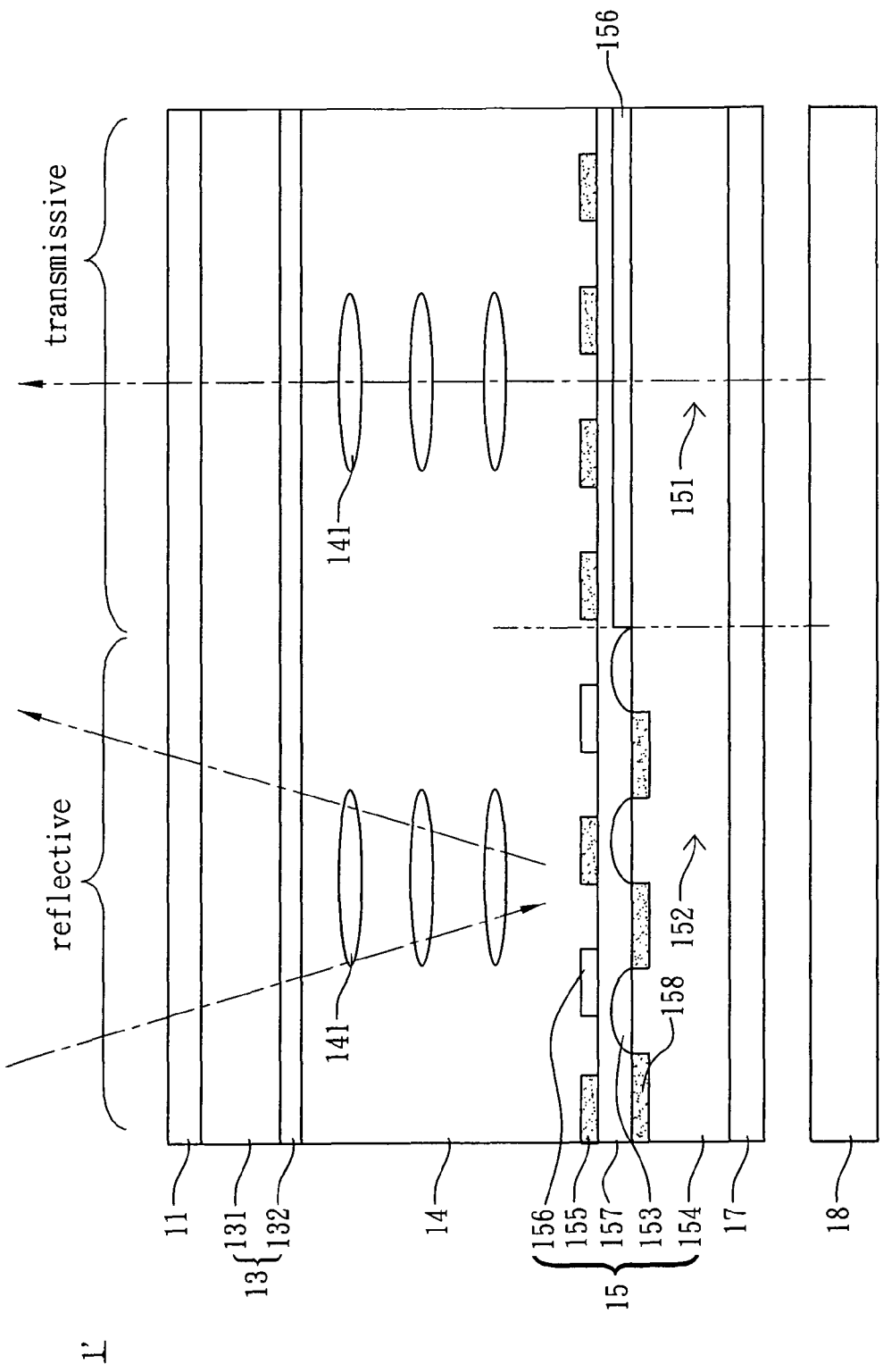
FIG. 5 is another schematic illustration showing an image display system according to the preferred embodiment of the invention.

Furthermore, as shown in FIG. 5, what is different from FIG. 1 is that some reflectors 153 are replaced with some light shields 158 in the light reflecting zone 152, wherein the light shields 158 and the reflectors 153 are disposed alternately so that the effect of reflecting the light can also be achieved. In addition, no retardation plate is disposed in an image display system 1' so that the cost of the retardation plate can be eliminated according to the simplified optical setting. Thus, the light penetrating through the LC layer 14 is the linearly polarized light but not the circularly polarized light or the elliptically polarized light. Under this architecture, the optical axis of the LC cell 141 is parallel to the absorbing axis of the first polarizer 11, so the influence of the variation of the cell gap between the substrates on the optical system is smaller so that the image quality can be kept.

Figure 6:
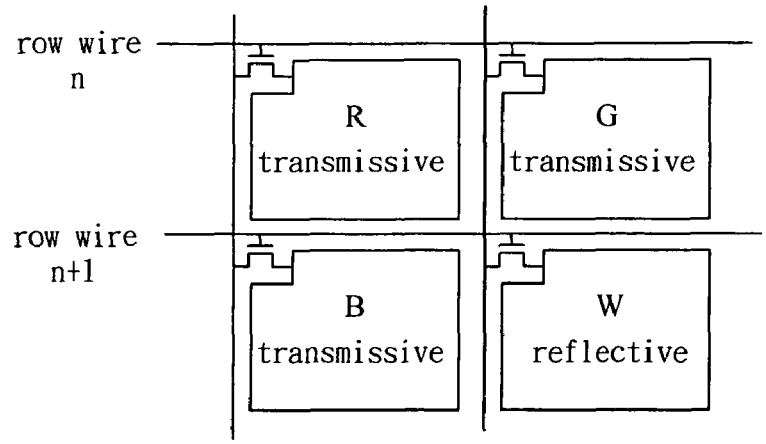
FIGS. 6 and 7 are schematic illustrations showing various architectures of pixels in the image display system according to the preferred embodiments of the invention.

Referring to FIG. 6, each pixel P of the image display system 1 in the embodiment may include four sub-pixels R, G, B and W, which are set to be red, green, blue and white sub-pixels. Red, green and blue filters are disposed on the first substrate 13 or the second substrate 15 corresponding to the sub-pixels R, G and B, a white filter or no filter is disposed on the first substrate 13 or the second substrate 15 corresponding to the sub-pixel W so that the white light may be displayed after the light penetrates therethrough.

The sub-pixels R, G and B are set to be transmissive sub-pixels. The arrangements of the elements in the sub-pixels R, G and B are similar to those in the light transmitting zone 151 of the second substrate 15 of the above-mentioned embodiment. The sub-pixel W is set to be a reflective sub-pixel, and the arrangements of the elements in the sub-pixel W are similar to those in the light reflecting zone 152 of the second substrate 15 of the above-mentioned embodiment. Consequently, if the external light is brighter, the sub-pixel W can properly respond with the light intensity to enhance the brightness of the image so that the image display system has the better display effect. Because the sub-pixels R, G and B still display the image in a transmissive manner, the image display system still can keep the image display quality.

In addition, the sub-pixels R and C are disposed on the same row and connected to the same row wire n, and the sub-pixel B and the reflective sub-pixel W are disposed in the same row and connected to another row wire n+1, wherein the row wires are adjacent to each other and are disposed at front and back sides.

The arrangement relationships between the color sub-pixels and the reflective sub-pixel are not limited thereto. The sub-pixels R and B may also be disposed in the same row and connected to the same row wire n, and the sub-pixel G and the reflective sub-pixel W may be disposed in the same row and connected to another row wire n+1. Alternatively, other combinations of arrangements are also practicable.

Figure 7:
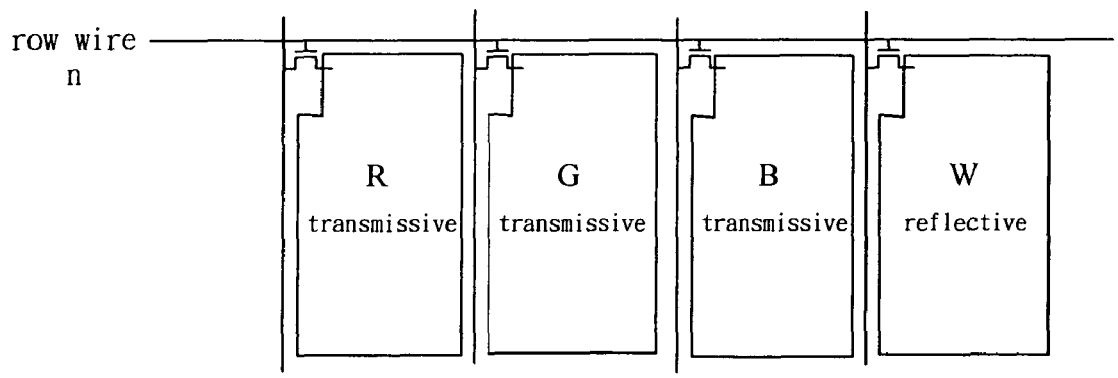

As shown in FIG. 7, what is different from FIG. 6 is that the color sub-pixels R, G and B and the reflective sub-pixel W are disposed in the same row, and the sub-pixels R, G, B and W are sequentially connected to the same row wire n. However, the arranged order of the sub-pixels is not limited thereto. The order of the sub-pixels R, B, G to W, and other orders are also practicable.

Figure 8:
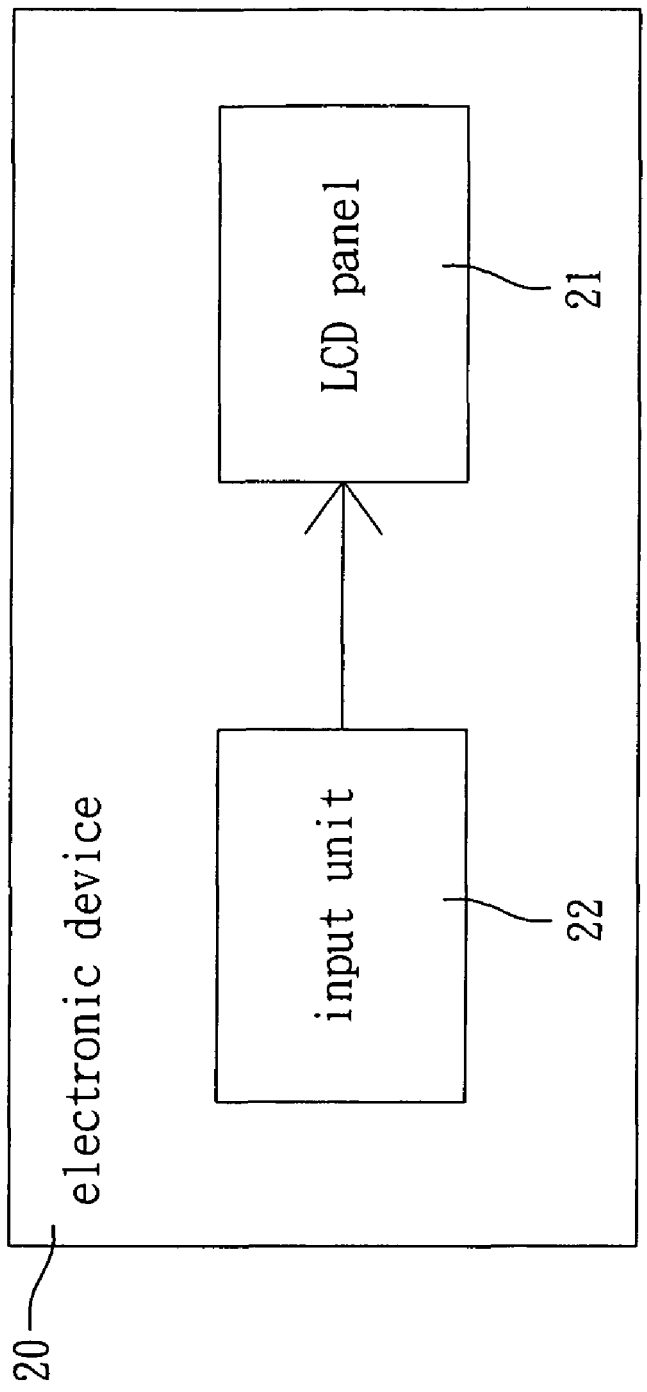
FIG. 8 is a schematic illustration showing an electronic device according to the preferred embodiment of the invention.

In addition, referring to FIG. 8, an image display system 2 further includes an electronic device 20, which has a LCD panel 21 and an input unit 22. The LCD panel 21 includes the elements, such as the first polarizer 11 to the second polarizer 17 of the above-mentioned embodiment. The input unit 22 is coupled to the LCD panel 21, and provides an input to the LCD panel 21 to make the LCD panel 21 display the image. The electronic device 20 of this embodiment may be, for example, a mobile phone, a digital camera, a personal digital assistant, a notebook computer, a desktop computer, a television, a vehicle display or a portable DVD player.

In summary, the image display system of this invention displays the image in a transflective manner, the optical axes of the LC cells are arranged to be parallel to the absorbing axis of the first polarizer when it is aligned, and the LC cells in the light reflecting zones and the light transmitting zones are respectively driven in the normally white mode and the normally black mode. Thus, the influence of the variation of the cell gap between the substrates on the optical system is smaller under this aligned architecture of the liquid crystals so that the image quality can be kept.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An image display system, comprising:
   a first substrate;
   a first polarizer disposed on the first substrate;
   a liquid crystal (LC) layer having a plurality of LC cells each having an optical axis parallel to an absorbing axis of the first polarizer;
   a second substrate having a plurality of light transmitting zones and a plurality of light reflecting zones, wherein a plurality of reflectors is disposed in the light reflecting zones, the LC cells are horizontally disposed between the first substrate and the second substrate, the LC cells corresponding to the light reflecting zones are driven in a normally white mode, and the LC cells corresponding to the light transmitting zones are driven in a normally black mode; and a plurality of pixels, wherein each of the pixels comprises:
  a plurality of color sub-pixels corresponding to the light transmitting zones; and
  a reflective sub-pixel corresponding to one of the light reflecting zones,
wherein the second substrate comprises:
  a plurality of pixel electrodes; and
  a plurality of common electrodes for generating a plurality of transversal electric fields in the LC layer in correspondence with the pixel electrodes,
  wherein the pixel electrodes in the light transmitting zone are arranged alternately and are respectively disposed on the common electrodes.

2. The image display system according to claim 1, further comprising:
  a first retardation plate disposed between the first polarizer and the first substrate;
  a second retardation plate disposed opposite to the LC layer and at one side of the second substrate; and
  a second polarizer, wherein the second polarizer and the second retardation plate are disposed at the same side of the second substrate, and the second retardation plate is disposed between the second polarizer and the second substrate.

3. The image display system according to claim 1, wherein the first substrate is a color filter substrate comprising:
  a first transparent substrate; and
  a plurality of color filters disposed at one side of the first transparent substrate adjacent to the LC layer.

4. The image display system according to claim 1, wherein the second substrate comprises:
  a second transparent substrate; and
  a plurality of thin film transistors disposed at one side of the second transparent substrate adjacent to the LC layer.

5. The image display system according to claim 1, wherein the second substrate comprises:
  a second transparent substrate;
  a plurality of color filters disposed at one side of the second transparent substrate adjacent to the LC layer; and
  a plurality of thin film transistors disposed at one side of the second transparent substrate adjacent to the LC layer.

6. The image display system according to claim 1, wherein the color sub-pixels and the reflective sub-pixel are disposed on adjacent two rows.

7. The image display system according to claim 1, wherein in one sub-pixel, the pixel electrodes of the light reflecting zone and the pixel electrodes of the light transmitting zone respectively provide different levels of operation voltages.

8. The image display system according to claim 1, wherein the pixel electrodes and the common electrodes in the light reflecting zone are arranged alternately.

9. The image display system according to claim 1, wherein the color sub-pixels at least comprises a red sub-pixel, a green sub-pixel and a blue sub-pixel.

10. The image display system according to claim 9, wherein the red sub-pixel and the green sub-pixel are disposed on one row, and the blue sub-pixel and the reflective sub-pixel are disposed on another row.

11. The image display system according to claim 1, wherein the color sub-pixels and the reflective sub-pixel are disposed on the same row.

12. The image display system according to claim 1, further comprising:
  a liquid crystal display (LCD) panel having the first polarizer, the first substrate, the LC layer and the second substrate.

13. The image display system according to claim 12, further comprising:
  a backlight module assembled with the second substrate of the LCD panel.

14. The image display system according to claim 13, further comprising:
  a liquid crystal display (LCD) device having the LCD panel and the backlight module.

15. The image display system according to claim 12, further comprising:
  an electronic device having the LCD panel and an input unit, wherein the input unit is coupled to the LCD panel, and provides an input to the LCD panel to make the LCD panel display an image.

16. The image display system according to claim 15, wherein the electronic device is a mobile phone, a digital camera, a personal digital assistant, a notebook computer, a desktop computer, a television, a vehicle display or a portable DVD player.

* * * * *